(12) United States Patent
She

(10) Patent No.: US 12,440,862 B2
(45) Date of Patent: Oct. 14, 2025

(54) WATER GUN

(71) Applicant: Jiansheng She, Shantou (CN)

(72) Inventor: Jiansheng She, Shantou (CN)

( * ) Notice: Subject to any disclaimer, the term of this patent is extended or adjusted under 35 U.S.C. 154(b) by 0 days.

(21) Appl. No.: 19/090,795

(22) Filed: Mar. 26, 2025

(65) Prior Publication Data

US 2025/0222484 A1 Jul. 10, 2025

(30) Foreign Application Priority Data

Mar. 6, 2025 (CN) .......................... 202520387733.9

(51) Int. Cl.
*B05B 9/01* (2006.01)
*B05B 17/04* (2006.01)
*F41B 9/00* (2006.01)

(52) U.S. Cl.
CPC ............... *B05B 17/04* (2013.01); *B05B 9/01* (2013.01); *F41B 9/00* (2013.01)

(58) Field of Classification Search
CPC .. B05B 17/06; B05B 9/01; B05B 7/02; B05B 7/1481; F41B 9/0068; F41B 9/0012; A63H 33/28
See application file for complete search history.

(56) References Cited

U.S. PATENT DOCUMENTS

| | | | |
|---|---|---|---|
| 2008/0277413 A1* | 11/2008 | Jablonski | F41B 9/0053 222/401 |
| 2009/0247043 A1 | 10/2009 | Liao | |
| 2016/0341515 A1 | 11/2016 | Liang | |
| 2018/0345164 A1* | 12/2018 | Venigalla | A63H 33/28 |
| 2019/0232323 A1* | 8/2019 | Adams | B05B 17/06 |
| 2023/0175810 A1 | 6/2023 | Lessmann et al. | |

* cited by examiner

*Primary Examiner* — Tuongminh N Pham
(74) *Attorney, Agent, or Firm* — Hemisphere Law, PLLC; Zhigang Ma

(57) ABSTRACT

A water gun is provided, including: a shell, provided with a liquid spraying position and mist spraying position; a liquid spraying mechanism, including a liquid storage cavity, a liquid spraying pump, and a liquid guide pipe group, wherein the liquid storage cavity and the liquid spraying pump are arranged on the shell; the liquid spraying pump is respectively communicated to liquid storage cavity and the liquid spraying position through the liquid guide pipe group; the liquid spraying pump is configured to pump liquid inside the liquid storage cavity to the liquid spraying position for spraying; and a mist spraying mechanism, including a to-be-atomized liquid tank and an atomizing element, wherein the to-be-atomized liquid tank is connected to a shell.

16 Claims, 16 Drawing Sheets

WATER GUN

TECHNICAL FIELD

The present disclosure relates to the field of toys, and in particular, to a water gun.

BACKGROUND

A water gun, as a popular entertainment device, has been loved by both children and adults. The traditional water gun mainly achieves a water spraying function through manual pumping or a pressure water storage tank, but its function is monotonous, and only an effect of linear water spraying can be provided. Furthermore, the water gun cannot achieve an effect such as a gun flame after being triggered, causing a low simulation degree.

SUMMARY

The present disclosure provides a water gun, which can solve the problems of monotonous functionality and low simulation degree.

The present disclosure provides a water gun, including:
- a shell, provided with a liquid spraying position and mist spraying position;
- a liquid spraying mechanism, including a liquid storage cavity, a liquid spraying pump, and a liquid guide pipe group, wherein the liquid storage cavity and the liquid spraying pump are arranged on the shell; the liquid spraying pump is respectively communicated to liquid storage cavity and the liquid spraying position through the liquid guide pipe group; the liquid spraying pump is configured to pump liquid inside the liquid storage cavity to the liquid spraying position for spraying; and
- a mist spraying mechanism, including a to-be-atomized liquid tank and an atomizing element, wherein the to-be-atomized liquid tank is connected to the shell; the atomizing element is configured to: receive liquid inside the to-be-atomized liquid tank and atomize the liquid; and a water mist output end of the atomizing element is communicated to the mist spraying position.

Preferably, the to-be-atomized liquid tank is provided with a to-be-atomized liquid filling port.

Preferably, the mist spraying mechanism further includes an atomization supply pump; a pump-in end of the atomization supply pump is communicated with the liquid storage cavity; and a pump-out end of the atomization supply pump is communicated with the to-be-atomized liquid tank.

Preferably, the mist spraying mechanism further includes a four-way joint; the four-way joint is communicated with the liquid storage cavity;
- the liquid spraying pump is communicated to the four-way joint through the liquid guide pipe group;
- the to-be-atomized liquid tank is provided with a reflux inlet; the reflux inlet is communicated to the four-way joint; and
- the pump-in end of the atomization supply pump is communicated to the four-way joint.

Preferably, the liquid guide pipe group includes a liquid spraying pump input pipe, a liquid spraying pump output pipe, a to-be-atomized liquid input pipe, a to-be-atomized liquid output pipe, and a to-be-atomized liquid reflux pipe;
- one end of the liquid spraying pump input pipe is communicated to the four-way joint, and the other end of the liquid spraying pump input pipe is communicated to an input end of the liquid spraying pump; one end of the liquid spraying pump output pipe is communicated to an output end of the liquid spraying pump; the other end of the liquid spraying pump output pipe is communicated to the liquid spraying position;
- one end of the to-be-atomized liquid input pipe is communicated to the four-way joint; the other end of the to-be-atomized liquid input pipe is communicated to the pump-in end of the atomization supply pump; one end of the to-be-atomized liquid output pipe is communicated to the pump-out end of the atomization supply pump; one end of the to-be-atomized liquid reflux pipe is communicated to the reflux inlet; and the other end of the to-be-atomized liquid reflux pipe is communicated to the four-way joint.

Preferably, the shell is provided with a muzzle; the liquid spraying position and the mist spraying position are both located on the muzzle;
- the water gun further includes a light-emitting mechanism; the light-emitting mechanism includes a mounting base and at least one light-emitting element; the mounting base is arranged on the muzzle; and the light-emitting element is arranged on the mounting base.

Preferably, the mounting base includes a mounting ring and at least one connecting arm; the liquid spraying position is arranged on the mounting ring; a through hole is provided in the liquid spraying position for liquid spraying; each connecting arm is arranged on the mounting ring; the connecting arm is connected to the muzzle; a peripheral outer side wall of the mounting ring and an inner wall surface of the muzzle jointly define the mist spraying position; and
- the connecting arm and/or the mounting ring is provided with the light-emitting element.

Preferably, the shell is further provided with an air spraying position;
- the water gun further includes an air spraying mechanism; the air spraying mechanism includes an air spraying pump and an air guide pipe group; the air spraying pump is mounted on the shell; the air spraying pump is communicated to the air spraying position through the air guide pipe group; and the air spraying pump is configured to pump air to the air spraying position, so that the air is sprayed out through the air spraying position.

Preferably, the water gun further includes a power mechanism; the power mechanism includes a first motor and a second motor; the first motor is in driving connection to the liquid spraying pump; and the second motor is in driving connection to the air spraying pump.

Preferably, the water gun further includes a power mechanism; the power mechanism includes a power motor, an output gear, an intermittent transmission gear, a transmission rack, an elastic member, and several transmission gears;
- the power motor is connected to the shell; the power motor is in driving connection to the output gear; the output gear is meshed with one of the transmission gears; the transmission gears are meshed in sequence; the intermittent transmission gear is coaxially connected to another transmission gear, and is meshed with the transmission rack; the transmission rack is arranged on the liquid spraying pump and/or the air spraying pump; the elastic member is in driving connection to the liquid spraying pump and/or the air spraying pump;
- when the power motor outputs a torque, the liquid spraying pump and the air spraying pump are driven to move, thereby increasing elastic potential energy of the elastic member; and the elastic member is configured to drive the liquid spraying pump and the air spraying pump to move when released, so that the liquid spraying pump pumps liquid, and the air spraying pump pumps air.

Preferably, the liquid spraying pump includes a liquid spraying pump cylinder and a liquid spraying piston; the liquid spraying pump cylinder is connected to the shell; the liquid spraying piston is slidably arranged inside the liquid spraying pump cylinder;

the air spraying pump includes an air spraying pump cylinder and an air spraying piston; the air spraying pump cylinder is connected to the shell; the air spraying piston is slidably arranged inside the air spraying pump cylinder;

the liquid spraying pump cylinder is connected to the air spraying pump cylinder; the liquid spraying piston is connected to the air spraying piston; the liquid spraying pump cylinder is respectively communicated to the liquid storage cavity and the liquid spraying position through the liquid guide pipe group; the air spraying pump cylinder is communicated to the air spraying position through the air guide pipe group;

the transmission rack is arranged on the liquid spraying piston and/or the air spraying piston; and the elastic member is in driving connection to the liquid spraying piston and/or the air spraying piston.

Preferably, one end of the liquid spraying pump cylinder is communicated to the liquid spraying position through the liquid guide pipe group; a side wall of the liquid spraying pump is communicated to the liquid storage cavity through the liquid guide pipe group, and the other end of the liquid spraying pump cylinder is aligned and communicated to an end portion of the air spraying pump cylinder; and a side wall of the air spraying pump cylinder is communicated to the air spraying position through the air guide pipe group.

Preferably, the water gun further includes a support mechanism; the support mechanism is arranged inside the shell, and the to-be-atomized liquid tank and the atomizing element are respectively connected to the support mechanism;

a liquid passing hole, an air passing hole, and an atomizing hole are provided in the support mechanism; the liquid guide pipe group passes through the liquid passing hole and is communicated to the liquid spraying position; the air guide pipe group is communicated to the air spraying position through the air passing hole; and the to-be-atomized liquid tank is communicated to the atomizing element through the atomizing hole.

Preferably, the support mechanism includes a support plate and a mounting plate; the support plate is arranged inside the shell; the liquid passing hole, the air passing hole, and the atomizing hole are all located on the support plate; the mounting plate and the to-be-atomized liquid tank are respectively pressed against two opposite side surfaces of the support plate; the mounting plate is connected to the to-be-atomized liquid tank; the atomizing element is located between the support plate and the mounting plate; the to-be-atomized liquid tank and the support plate jointly define a to-be-atomized liquid cavity; and the to-be-atomized liquid cavity is communicated to the atomizing hole.

Preferably, the atomizing element is an atomizing sheet, and the atomizing sheet is configured to atomize liquid through high-frequency vibration.

Preferably, the shell includes a gun body, a muzzle, and a collar; the muzzle is connected to the gun body; the collar sleeves the muzzle, thereby defining an air spraying channel between the collar and the muzzle; the air spraying position is located at an end portion of the air spraying channel; and the air spraying pump is communicated to an air spraying pipeline through the air guide pipe group.

Preferably, the water gun further includes a power supply mechanism; the power supply mechanism is connected to the shell, and the power supply mechanism is electrically connected to the atomizing element.

Preferably, the power supply mechanism includes a slider, a battery, a first conductive part, a second conductive part, a sliding chute, and a guide rail;

one of the sliding chute and the guide rail is arranged on the slider, and the other one of the sliding chute and the guide rail is arranged on the shell; the battery and the first conductive part are arranged on the slider; the second conductive part is arranged on the shell; the atomizing element is electrically connected to the atomizing element;

the slider is slidably connected to the shell through the sliding chute and the guide rail, so that the first conductive part is detachably connected to the second conductive part; and the battery is electrically connected to the atomizing element through the first conductive part and the second conductive part.

The present disclosure has the following beneficial effects:

The present disclosure relates to a water gun. By the arrangement of the liquid spraying mechanism and the mist spraying mechanism, liquid can be sprayed from the liquid spraying position, and mist can be sprayed from the mist spraying position, which greatly enriches functionality of the product. Furthermore, liquid and mist can be sprayed simultaneously, so that an effect of gun flame of a firearm can be simulated through water mist, which greatly increases a simulation degree of the product.

BRIEF DESCRIPTION OF THE DRAWINGS

The exemplary implementations of the present disclosure will be described in more details by combining the accompanying drawings. The above and other objectives, features, and advantages of the present disclosure will become more obvious. In the exemplary implementations of the present disclosure, the same reference numerals generally represent the same components.

DETAILED DESCRIPTION OF THE EMBODIMENTS

Figure 1:
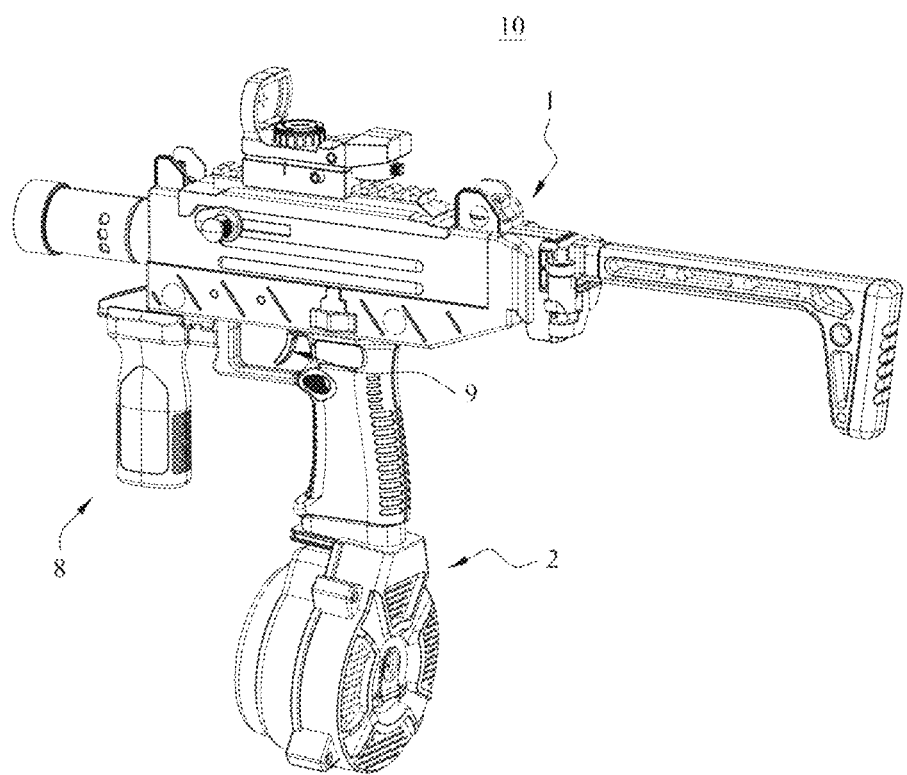
FIG. 1 is a schematic structural diagram of a water gun in some embodiments of the present disclosure.

The implementations of the present disclosure will be described in more details below with reference to the accompanying drawings. Although the accompanying drawings show the exemplary implementations of the present disclosure, it should be understood that the present disclosure can be implemented in various forms, and should not be limited to the implementations stated herein. Rather, these implementations are provided for understanding the present disclosure more thoroughly and completely, and can completely transfer the scope of the present disclosure to those skilled in the art.

It should be understood that although various information may be described using terms such as "first", "second", and "third" in the present disclosure, such information should not be limited to these terms. These terms are only used to distinguish information of the same type from each other. For example, without departing from the scope of the present disclosure, the first information can also be referred to as the second information, and similarly, the second information can also be referred to as the first information. Thus, features defined as "first" and "second" explicitly or implicitly include one or more of the features. In the description of the present disclosure, "plurality" means two or more, unless otherwise expressly and specifically defined.

In the descriptions of the present disclosure, it should be understood that orientations or positional relationships indicated by the terms "length", "width", "upper", "lower", "front", "rear", "left", "right", "vertical", "horizontal", "top", "bottom", "inner", "outer", and the like are orientations or positional relationships as shown in the drawings, and are only for the purpose of facilitating and simplifying the descriptions of the present disclosure instead of indicating or implying that devices or elements indicated must have particular orientations, and be constructed and operated in the particular orientations, so that these terms are not construed as limiting the present disclosure.

Unless otherwise expressly specified and limited, the terms "mount", "connect", "connection", "fix" the like should be understood in a broad sense, such as, a fixed connection, a detachable connection, an integrated connection, a mechanical connection, an electrical connection, a direct connection, an indirect connection through an intermediate medium, an internal communication of two elements, or interaction between two elements. For those of ordinary skill in the art, the specific meanings of the aforementioned terms in the present disclosure can be understood based on specific conditions.

Figure 2:
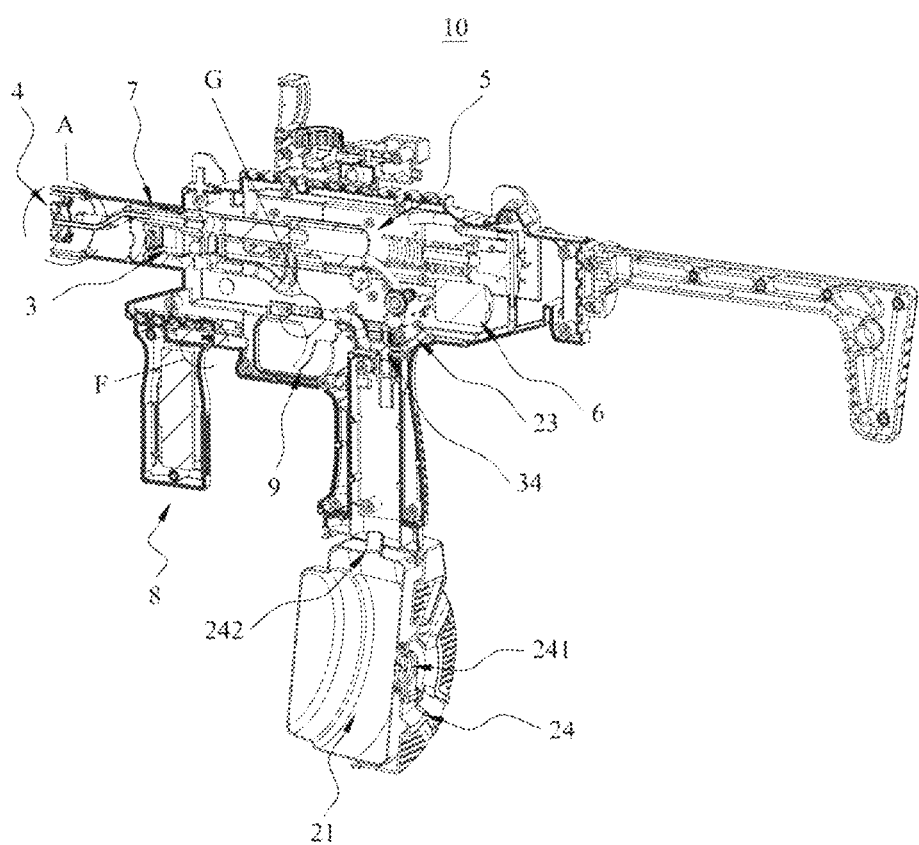
FIG. 2 is a schematic diagram of an inner structure of a water gun in some embodiments of the present disclosure.

FIG. 1 and FIG. 2 show a water gun 10 in some embodiments of the present disclosure. The water gun 10 can spray liquid and water mist. The water gun 10 includes a shell 1, a liquid spraying mechanism 2, and a mist spraying mechanism 3. The shell 1 plays a role of supporting and mounting other mechanisms. The liquid spraying mechanism 2 is configured for liquid spraying, and the mist spraying mechanism 3 is configured for generating water mist during operation.

As shown in FIG. 2 to FIG. 5, the shell 1 is provided with a liquid spraying position 11 and a mist spraying position 12. The liquid spraying mechanism 2 includes a liquid storage cavity 21, a liquid spraying pump 22, and a liquid guide pipe group 23. The liquid storage cavity 21 and the liquid spraying pump 22 are arranged on the shell 1. The liquid spraying pump 22 is respectively communicated to the liquid storage cavity 21 and the liquid spraying position 11 through the liquid guide pipe group 23. The liquid spraying pump 22 is configured to pump liquid inside the liquid storage cavity 21 to the liquid spraying position 11 for spraying.

Referring to FIG. 6 to FIG. 10, the mist spraying mechanism 3 includes a to-be-atomized liquid tank 31 and an atomizing element 32. The to-be-atomized liquid tank 31 is connected to the shell 1. The atomizing element 32 is configured to: receive liquid inside the to-be-atomized liquid tank 31 and atomize the liquid. A water mist output end of the atomizing element 32 is communicated to the mist spraying position 12.

It can be understood that the liquid spraying position 11 is configured to spray liquid, and the mist spraying position 12 is configured to spray water mist. The liquid spraying position 11 and the mist spraying position 12 can be arranged in parallel or in different regions, to achieve switching or synchronization operation of different spraying modes.

The liquid storage cavity 21 is arranged inside the shell 1 or hooked to an outer side part of the shell 1. The liquid storage cavity 21 is configured to store liquid to be sprayed (such as water or colored liquid). The liquid spraying pump 22 can be configured as an electric pump driven by electricity or a manual pump driven by an operator. The liquid spraying pump 22 is configured to provide power for liquid flowing. The liquid guide pipe group 23 plays a role in guiding the liquid to flow. When the liquid spraying pump 22 is turned on, the liquid in the liquid storage cavity 21 is pressurized and is conveyed to the liquid spraying position 11 through the liquid guide pipe group 23, thus spraying liquid.

The to-be-atomized liquid tank 31 can be configured to be independently arranged inside the shell 1 or to share a space with the liquid storage cavity 21. The to-be-atomized liquid tank 31 is configured to store liquid needing to be atomized. The to-be-atomized liquid tank 31 can be isolated from the liquid storage cavity 21 by an isolation structure to avoid liquid mixing. The atomizing element 32 is configured to convert the liquid into water mist, so that the water mist can be sprayed out from the mist spraying position.

It should be noted that the dual functions of liquid spraying and mist spraying are achieved by arranging the liquid spraying mechanism and the mist spraying mechanism, and functions of the water gun are enriched. Furthermore, the atomizing element is directly connected to the dedicated to-be-atomized liquid tank 31, to ensure supply of liquid to the atomizing element and uniform and stable generation of water mist, which further enhances the gun flame simulation effect of the product and increases the simulation degree of the product.

Figure 10:
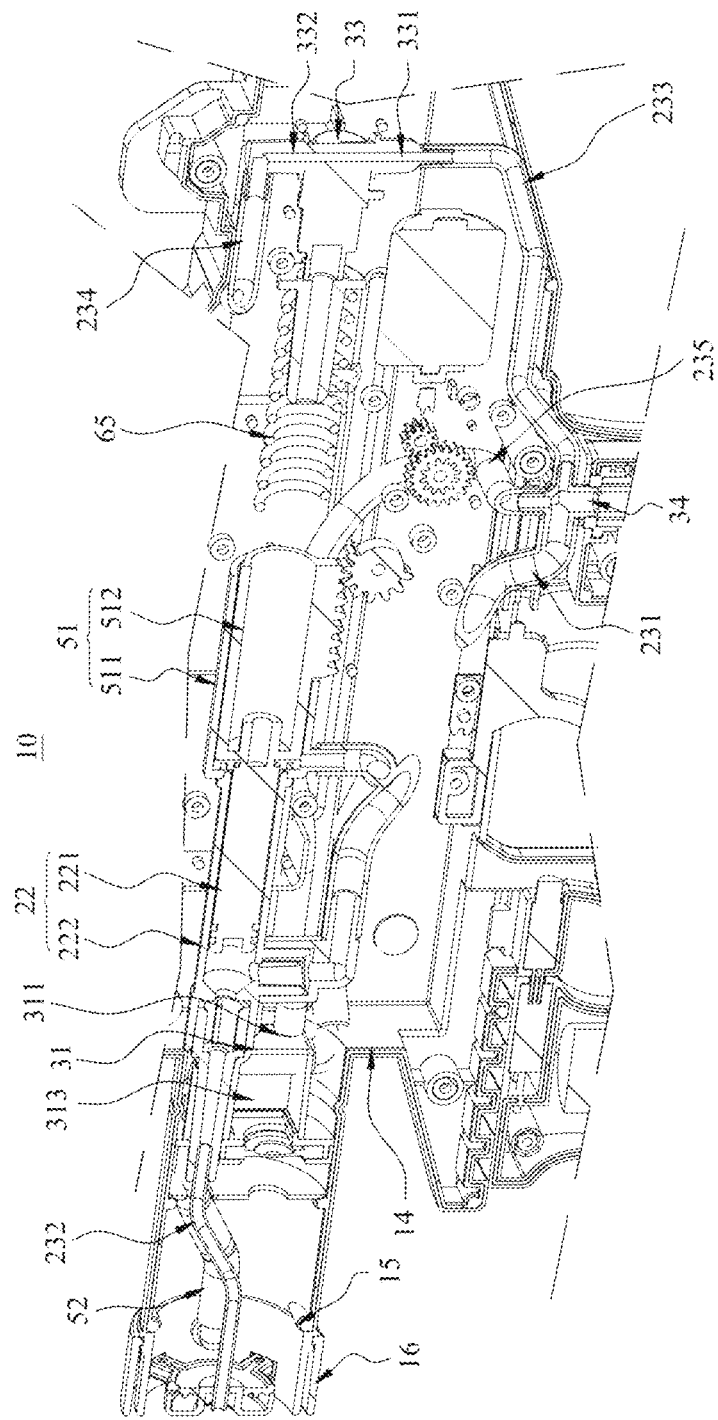
FIG. 10 is a schematic partially structural diagram of the water gun shown in FIG. 2.

As shown in FIG. 10, in some implementations of the water gun 10, the to-be-atomized liquid tank 31 is provided with a to-be-atomized liquid filling port 311.

It can be understood that the to-be-atomized liquid filling port 311 is provided in a top or a side part of the to-beatomized liquid tank 31. The to-be-atomized liquid filling port 311 is configured to supplement liquid required for atomization (such as purified water) into the to-be-atomized liquid tank 31. The to-be-atomized liquid filling port 311 can be designed to be a screw cap, buckle sealing, or check valve structure, to prevent liquid leakage. According to the content of this embodiment, the operation of supplementing to-be-atomized liquid can be simplified; the convenience of use by a user is improved; and the leakproofness of the to-be-atomized liquid tank is ensured.

Figure 15:
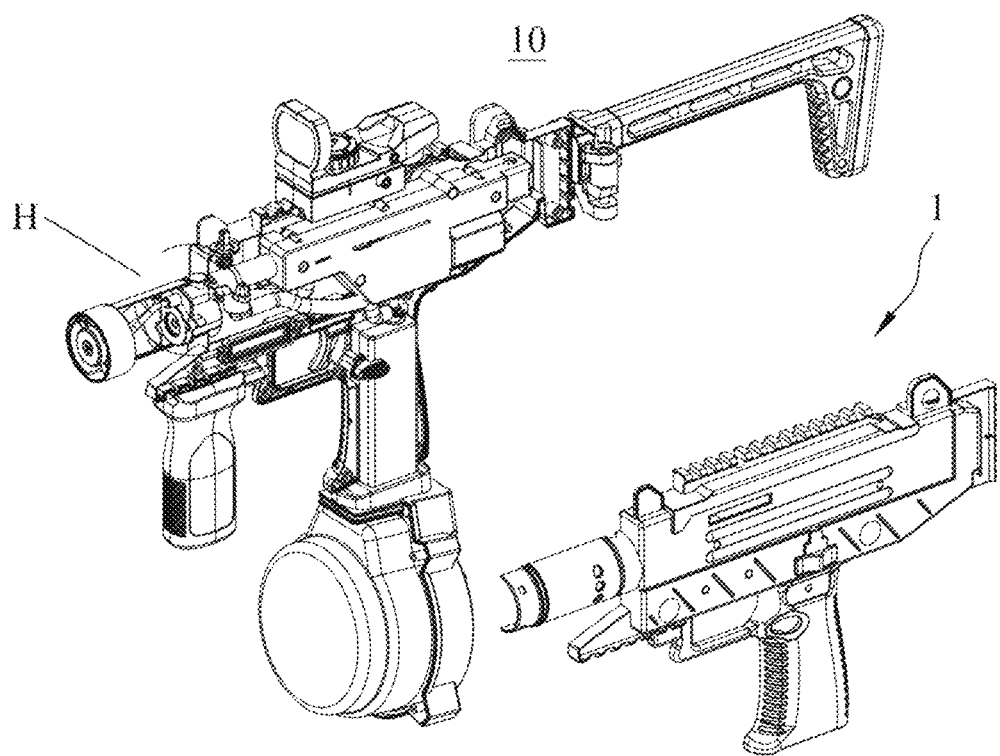
FIG. 15 is a schematic structural diagram of a water gun in some other embodiments of the present disclosure.
Figure 16:
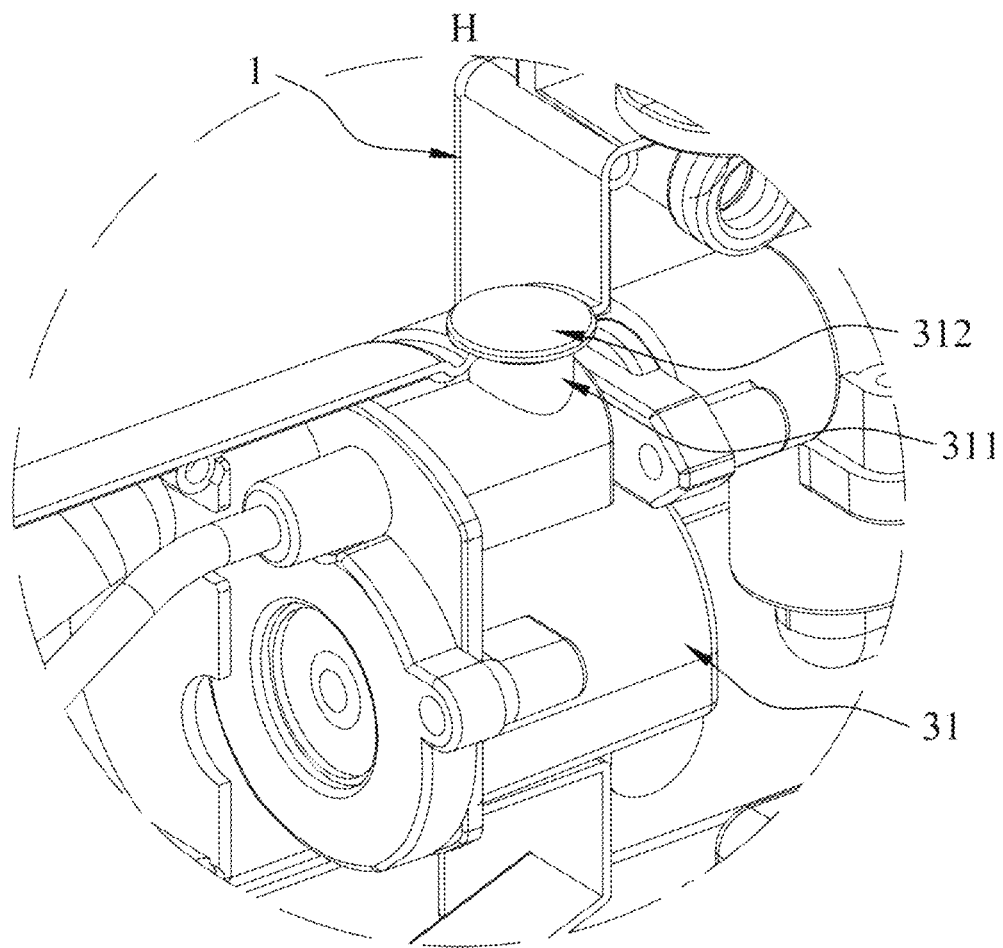
FIG. 16 is an enlarged view of part H of the water gun shown in FIG. 15.

Further, as shown in FIG. 15 and FIG. 16, in some embodiments of the water gun 10, the to-be-atomized liquid filling port 311 extends to an outer surface of the shell 1, and the to-be-atomized liquid filling port 311 can be covered with a filling cap 312.

It can be understood that a user can directly remove the filling cap 312 to open the to-be-atomized liquid filling port 311, so that liquid can be injected into the to-be-atomized liquid tank 31 through the to-be-atomized liquid filling port 311. In this way, an additional water pump does not need to be arranged to supply liquid to the to-be-atomized liquid tank 31, which eliminates a water pump and a matching pipeline, thus greatly reducing the production and manufacturing costs of the product, and avoiding an increase in the volume of the product caused by too many pipelines. This helps to improve the compactness of the product.

Figure 8:
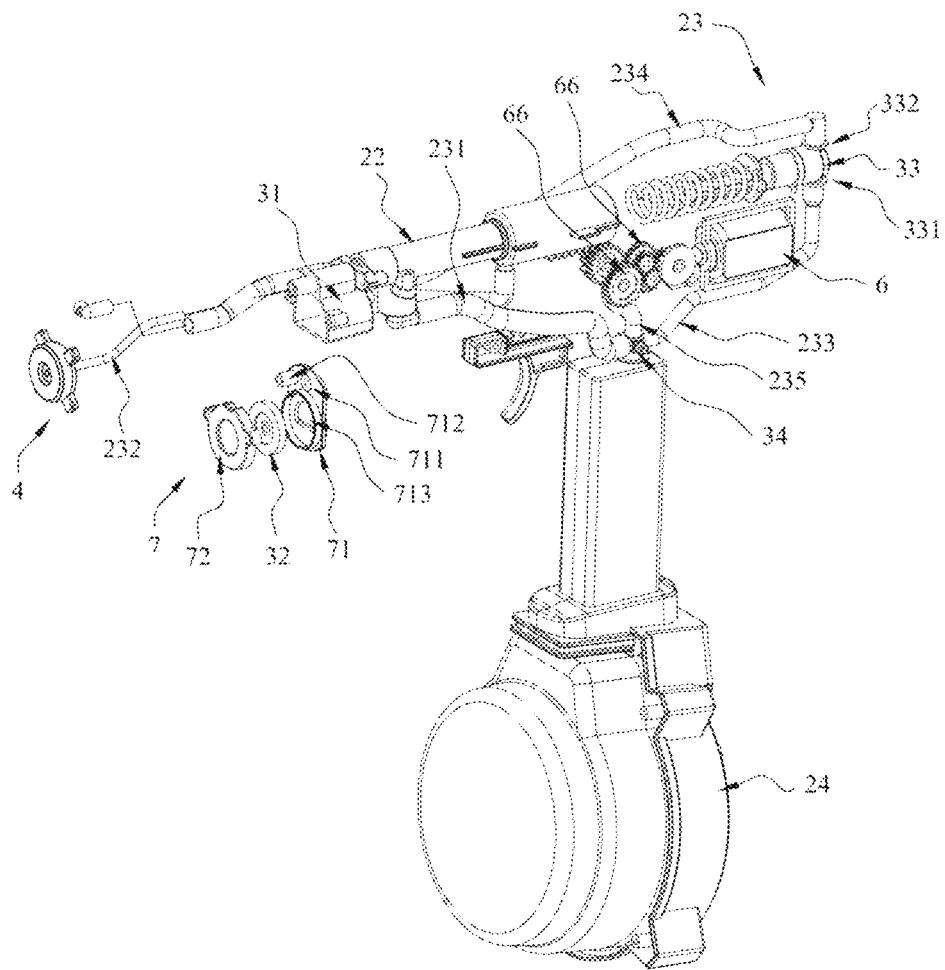
FIG. 8 is an exploded view of some structures of a water gun in some embodiments of the present disclosure.
Figure 9:
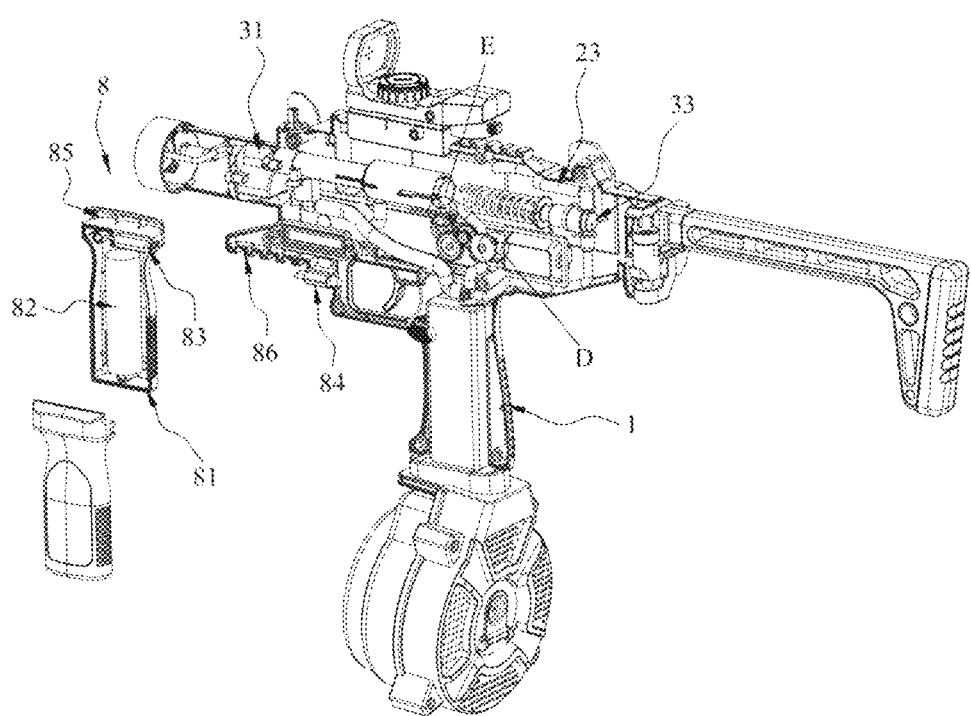
FIG. 9 is an exploded view of some structures of a water gun in some other embodiments of the present disclosure.

As shown in FIG. 8 to FIG. 10, in some implementations of the water gun 10, the mist spraying mechanism 3 further includes an atomization supply pump 33. A pump-in end 331 of the atomization supply pump 33 is communicated with the liquid storage cavity 21. A pump-out end 332 of the atomization supply pump 33 is communicated with the to-be-atomized liquid tank 31.

It can be understood that the atomization supply pump 33 can pump the liquid inside the liquid storage cavity 21 to the to-be-atomized liquid tank 31, achieving timely and rapid supplementation of the to-be-atomized liquid. A switch can be further configured to: independently control start and stop of the atomization supply pump 33, adjust a liquid level of the to-be-atomized liquid tank 31, and avoid a failure of the atomizing element 32 due to lack of liquid.

It should be noted that according to the content of this embodiment, the liquid storage cavity and the to-be-atomized liquid tank can share liquid, so that an additional filling operation can be reduced, and the continuous use time of a mist spraying function can be prolonged.

As shown in FIG. 2, FIG. 8, and FIG. 10, in some implementations of the water gun 10, the mist spraying mechanism 3 further includes a four-way joint 34. The four-way joint 34 is communicated with the liquid storage cavity 21. The liquid spraying pump 22 is communicated to the four-way joint 34 through the liquid guide pipe group 23. The to-be-atomized liquid tank 31 is provided with a reflux inlet. The reflux inlet is communicated to the four-way joint 34. The pump-in end 331 of the atomization supply pump 33 is communicated to the four-way joint 34.

It can be understood that the four-way joint 34 serves as a liquid distribution hub, to coordinate a liquid flowing direction of a liquid spraying function and a liquid flowing direction of an atomizing function. The arrangement of the four-way joint 34 can optimize a layout of liquid pipelines, improve the system stability, and lower a risk of leakage caused by a non-uniform liquid pressure.

Further, the four-way joint 34 can be configured to be directly arranged on the liquid storage cavity 21, or can be configured to be communicated to the liquid storage cavity 21 through a pipeline.

As shown in FIG. 4 to FIG. 10, in some implementations of the water gun 10, the liquid guide pipe group 23 includes a liquid spraying pump input pipe 231, a liquid spraying pump output pipe 232, a to-be-atomized liquid input pipe 233, a to-be-atomized liquid output pipe 234, and a to-be-atomized liquid reflux pipe 235.

One end of the liquid spraying pump input pipe 231 is communicated to the four-way joint 34, and the other end of the liquid spraying pump input pipe 231 is communicated to an input end of the liquid spraying pump 22. One end of the liquid spraying pump output pipe 232 is communicated to an output end of the liquid spraying pump 22. The other end of the liquid spraying pump output pipe 232 is communicated to the liquid spraying position 11.

One end of the to-be-atomized liquid input pipe 233 is communicated to the four-way joint 34. The other end of the to-be-atomized liquid input pipe 233 is communicated to the pump-in end 331 of the atomization supply pump 33. One end of the to-be-atomized liquid output pipe 234 is communicated to the pump-out end 332 of the atomization supply pump 33. One end of the to-be-atomized liquid reflux pipe 235 is communicated to the reflux inlet. The other end of the to-be-atomized liquid reflux pipe 235 is communicated to the four-way joint 34.

It can be understood that the liquid spraying pump input pipe 231 is configured to convey liquid to the liquid spraying pump. The liquid spraying pump output pipe 232 is configured to guide the pressurized liquid to be sprayed. The to-be-atomized liquid input pipe 233 is configured to convey liquid to the atomization supply pump 33. The to-be-atomized liquid output pipe 234 is configured to guide the liquid pumped out by the atomization supply pump 33 to the to-be-atomized liquid tank 31. The to-be-atomized liquid reflux pipe 235 is configured to enable excess liquid inside the to-be-atomized liquid tank 31 to reflux to the liquid storage cavity 21.

Figure 4:
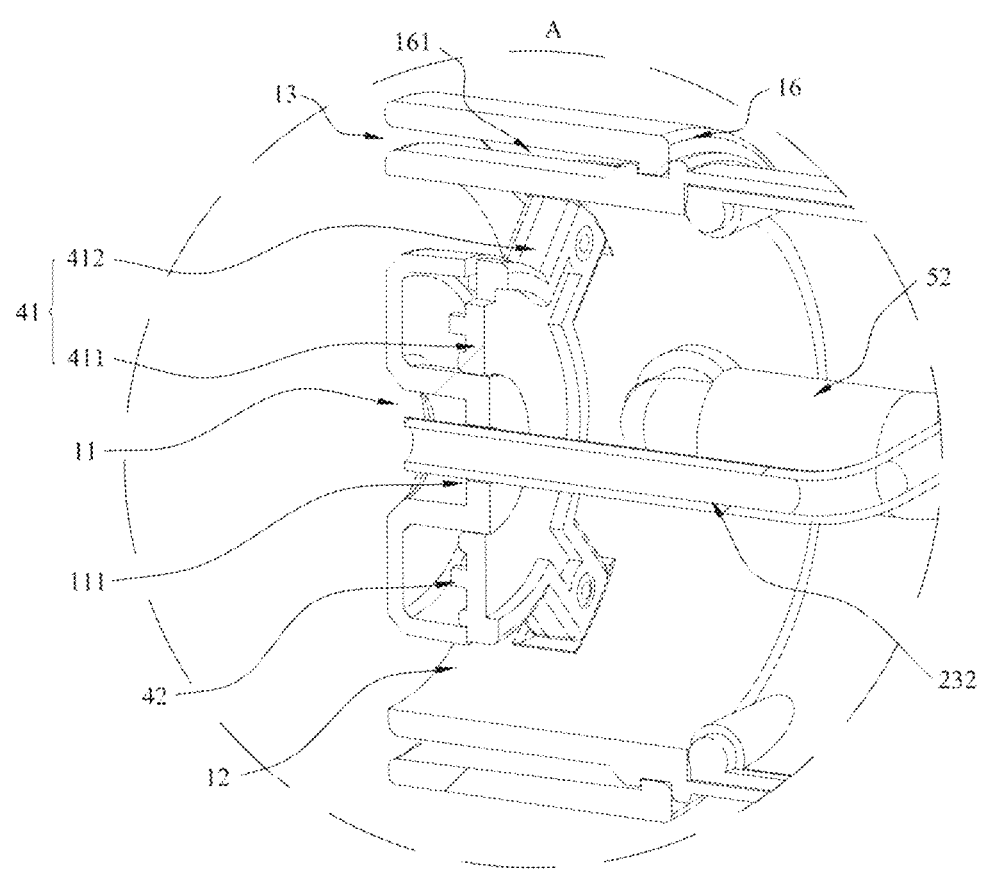
FIG. 4 is an enlarged view of part A of the water gun shown in FIG. 2.
Figure 5:
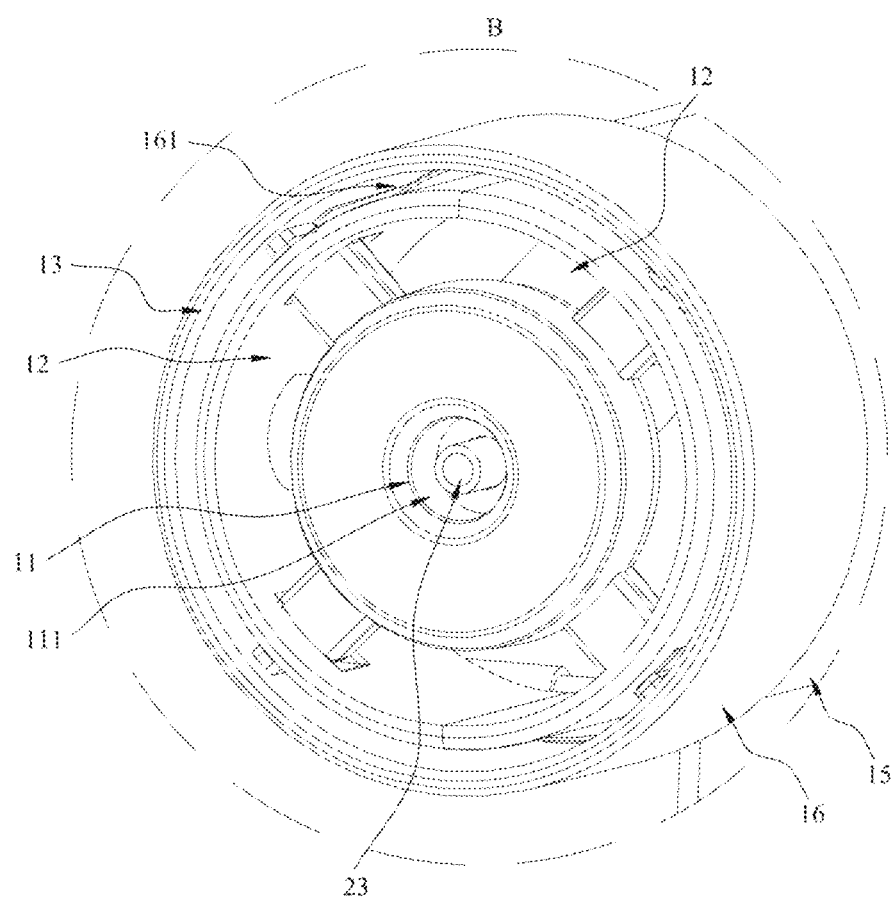
FIG. 5 is an enlarged view of part B of the water gun shown in FIG. 3.

As shown in FIG. 4 and FIG. 5, in some implementations of the water gun 10, the shell 1 is provided with a muzzle 15. The liquid spraying position 11 and the mist spraying position 12 are both located on the muzzle 15. The water gun 10 further includes a light-emitting mechanism 4. The light-emitting mechanism 4 includes a mounting base 41 and at least one light-emitting element 42. The mounting base 41 is arranged on the muzzle 15. The light-emitting element 42 is arranged on the mounting base 41.

It can be understood that the light-emitting mechanism 4 is configured to emit light during operation. The mounting base 41 is configured to provide a position at the muzzle 15 to mount the light-emitting element 42, namely, to play a role of limiting a position of the light-emitting element 42 on the muzzle 15. The light-emitting element 42 is configured to emit light when being powered on for operation. The light emitted by the light-emitting element 42 can illuminate the water mist sprayed by the mist spraying position 12 of the muzzle 15, so that the water mist can form a visual effect similar to gun flame under the illumination of the light. In this way, the fun and ornamental value of the water gun are increased, and a flame effect of a real firearm during shooting can be simulated.

As shown in FIG. 4 and FIG. 5, in some implementations of the water gun 10, the mounting base 41 includes a mounting ring 411 and at least one connecting arm 412. The liquid spraying position 11 is arranged on the mounting ring 411. A through hole 111 is provided in the liquid spraying position 11 for liquid spraying. Each connecting arm 412 is arranged on the mounting ring 411. The connecting arm 412 is connected to the muzzle 15. A peripheral outer side wall of the mounting ring 411 and an inner wall surface of the muzzle 15 jointly define the mist spraying position 12. The connecting arm 412 and/or the mounting ring 411 is provided with the light-emitting element 42.

It can be understood that the through hole 111 is provided in the liquid spraying position 11 located at a central position of the mounting ring 411 for direct liquid spraying. Each connecting arm 412 is symmetrically or radially distributed at an outer edge of the mounting ring 411, with one end fixed to the mounting ring 411 and the other end connected to an inner wall of the muzzle 15, thus forming stable support. Certainly, the connecting arm 412 can also be connected to the inner wall of the muzzle 15 in a clamped manner. The mist spraying position 12 is composed of an annular gap between the peripheral outer side wall of the mounting ring 411 and the inner wall of the muzzle 15 for water mist diffusion and spraying. The light-emitting element 42 is mounted on the connecting arm 412 or the mounting ring 411 (such as a light-emitting diode (LED)), and is connected to a power module inside the shell 1 through a wire. Certainly, the light-emitting element 42 can be configured to be mounted at a connection position at which the connecting arm is connected to the mounting ring.

The liquid spraying position 11 sprays liquid through the through hole 111, and the mist spraying position 12 uniformly diffuses the water mist through the gap between the mounting ring 411 and the muzzle 15. On the one hand, the connecting arm 412 plays a role of fixing the position of the mounting ring; and on the other hand, blocking of a spray-out path of the water mist can be avoided.

It should be noted that the light of the light-emitting element 42 directly illuminates the water mist sprayed from the mist spraying position 12 to achieve a dynamic light shadow effect, which simulates a visual effect of gun flame during shooting of the water gun. The light can further enhance the fun by color switching or a flashing mode (such as alternating red light and blue light). In addition, liquid spraying, mist spraying, and light-emitting functions are integrated on the muzzle 15, which is compact in structure and high in function integration.

As shown in FIG. 4 and FIG. 5, in some implementations of the water gun 10, the shell 1 is further provided with an air spraying position 13. Referring to FIG. 10, the water gun 10 further includes an air spraying mechanism 5 (for the air spraying mechanism 5, see FIG. 2). The air spraying mechanism 5 includes an air spraying pump 51 and an air guide pipe group 52. The air spraying pump 51 is mounted on the shell 1. The air spraying pump 51 is communicated to the air spraying position 13 through the air guide pipe group 52. The air spraying pump 51 is configured to pump air to the air spraying position 13, so that the air is sprayed out through the air spraying position 13.

It can be understood that the air spraying position 13 is configured to spray an air flow. The air spraying pump 51 can be configured to be mounted outside or inside the shell 1, thus generating compressed air through electric drive (such as a direct-current motor). When the air spraying pump 51 is turned on, external air can be conveyed to the air spraying position 13 through the air guide pipe group 52 after being pressurized, thus forming a high-speed air flow. An air spraying direction can be in the same direction as or staggered from the liquid spraying position 11 and the mist spraying position 12 to simulate a recoil force or enhance a water mist diffusion effect.

It should be noted that the air spraying mechanism 5 can be configured for independent operation (such as only spraying air) or linked with the liquid spraying mechanism/ the mist spraying mechanism (such as simultaneously spraying liquid and air to simulate a sound effect and air flow impact during shooting of the water gun). In addition, the air flow assists in water mist diffusion, which can expand a mist spraying coverage range, thus enhancing the visual effect.

The air guide pipe group 52 includes at least one air guide pipe in some implementations, and the air spraying pump 51 is communicated to the air spraying position 13 through each air guide pipe.

As shown in FIG. 2, in some implementations of the water gun 10, the water gun 10 further includes a power mechanism 6. The power mechanism 6 includes a first motor and a second motor. The first motor is in driving connection to the liquid spraying pump 22, and the second motor is in driving connection to the air spraying pump 51.

It can be understood that the first motor is configured to control a pressure and flow rate of liquid pumping. The second motor is configured to adjust an intensity and frequency of air flow spraying. Further, the water gun 10 can be further configured to include a control module (not shown). The control module can be integrated into the shell 1 and can receive a user operation instruction (such as a trigger button and a mode switch) to independently or synchronously control operation states of the first motor and the second motor.

It should be noted that the dual-motor setting method used in this implementation can avoid mutual interference between the liquid spraying function and the air spraying function, thus ensuring system stability. Moreover, this implementation can allow a user to enable the air spraying or liquid spraying function separately, or to enable both the air spraying function and the liquid spraying function simultaneously.

As shown in FIG. 8 to FIG. 10, in some implementations of the water gun 10, the water gun 10 further includes a power mechanism 6. The power mechanism 6 includes a power motor 61, an output gear 62, an intermittent transmission gear 63, a transmission rack 64, an elastic member 65, and several transmission gears 66.

Figure 11:
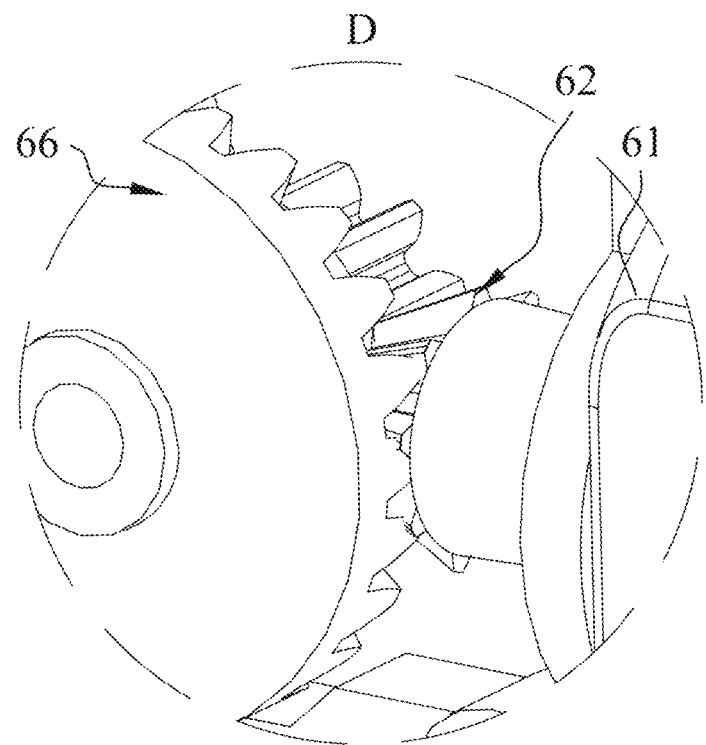
FIG. 11 is an enlarged view of part D of the water gun shown in FIG. 9.
Figure 12:
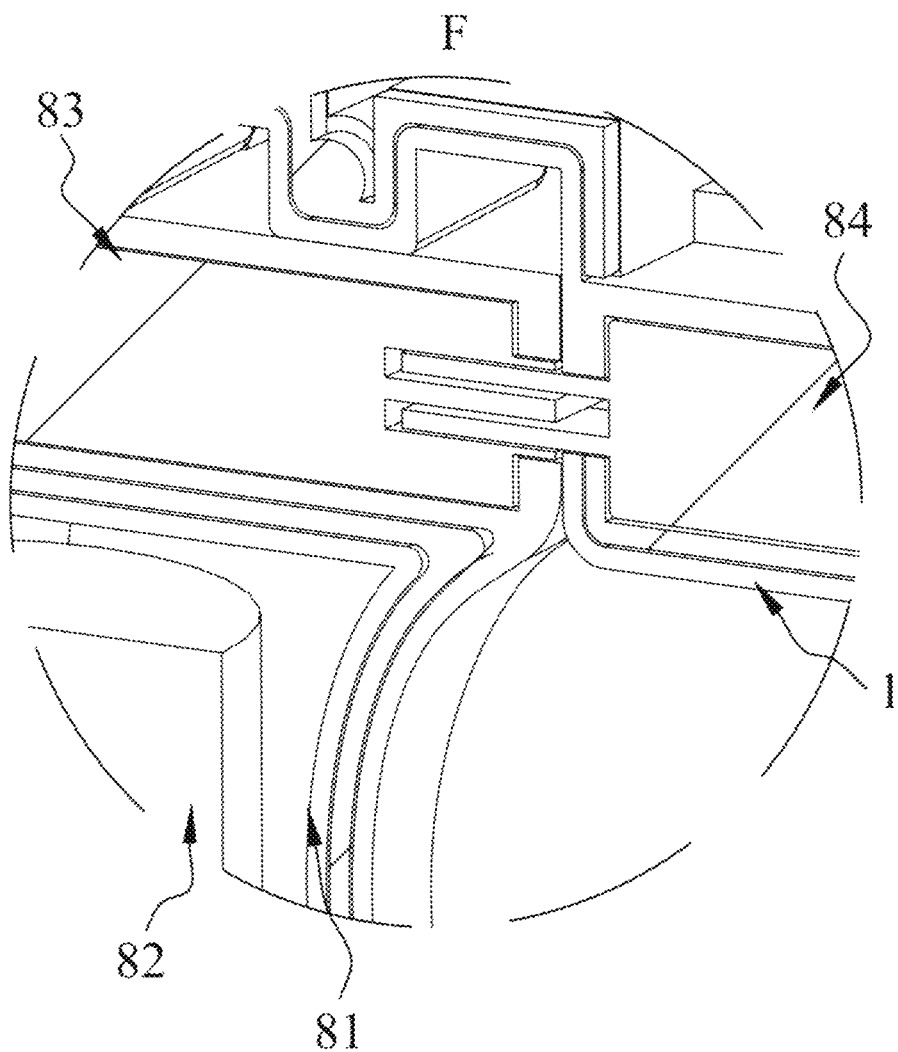
FIG. 12 is an enlarged view of part E of the water gun shown in FIG. 9.

The power motor 61 is connected to the shell 1. The power motor 61 is in driving connection to the output gear 62 (as shown in FIG. 11). The output gear 62 is meshed with one of the transmission gears 66 (as shown in FIG. 11). The transmission gears 66 are meshed in sequence (as shown in FIG. 8). The intermittent transmission gear 63 is coaxially connected to another transmission gear 66 (as shown in FIG. 12), and is meshed with the transmission rack 64 (as shown in FIG. 12). The transmission rack 64 is arranged on the liquid spraying pump 22 and/or the air spraying pump 51 (as shown in FIG. 12). The elastic member 65 is in driving connection to the liquid spraying pump 22 and/or the air spraying pump 51 (as shown in FIG. 10).

When the power motor 61 outputs a torque, the liquid spraying pump 22 and the air spraying pump 51 are driven to move, thereby increasing elastic potential energy of the elastic member 65. The elastic member 65 is configured to drive the liquid spraying pump 22 and the air spraying pump 51 to move when released, so that the liquid spraying pump 22 pumps liquid, and the air spraying pump 51 pumps air.

It can be understood that the power motor 61 is fixed inside the shell 1 and is configured to output a torque when powered on for operation. Output gear 62 is connected to an output shaft of the power motor 61 to receive the torque of the motor. The plurality of transmission gears 66 are meshed in sequence to transmit power to the transmission gear 66 at the tail. The intermittent transmission gear 63 is coaxially connected to one of the transmission gears 66, and the intermittent transmission gear 63 is configured to convert rotational motion into intermittent linear motion of the transmission rack 64. The transmission rack 64 can be configured to be connected only to the liquid spraying pump 22 or the air spraying pump 51, or the transmission rack 64 can be configured to be connected to both the liquid spraying pump 22 and the air spraying pump 51 simultaneously. The elastic member 65 can be configured as a spring, an elastic sheet, or another components in the prior art that can provide an elastic force. One end of the elastic member 65 is connected to the shell 1, and the other end is connected to the liquid spraying pump 22 or the air spraying pump 51. The elastic member 65 is configured to store and release the elastic potential energy.

It should be noted that the power motor 61 drives the transmission rack 64 through the output gear 62, the transmission gear 66, and the intermittent transmission gear 63, thereby driving the liquid spraying pump 22 and the air spraying pump 51 to move together, and then driving the elastic member 65 to deform, which increases the elastic potential energy of the elastic member 65. When the intermittent transmission gear 63 is demeshed from the transmission rack 64, the elastic member 65 releases the potential energy, to push a liquid spraying piston 221 and an air spraying piston 512 to be quickly reset. In this way, the liquid spraying pump 22 and the air spraying pump 51 can move back and forth, to pump liquid and air.

As shown in FIG. 10, in some implementations of the water gun 10, the liquid spraying pump 22 includes a liquid spraying pump cylinder 222 and a liquid spraying piston 221. The liquid spraying pump cylinder 222 is connected to the shell 1. The liquid spraying piston 221 is slidably arranged inside the liquid spraying pump cylinder 222.

The air spraying pump 51 includes an air spraying pump cylinder 511 and an air spraying piston 512. The air spraying pump cylinder 511 is connected to the shell 1. The air spraying piston 512 is slidably arranged inside the air spraying pump cylinder 511.

The liquid spraying pump cylinder 222 is connected to the air spraying pump cylinder 511. The liquid spraying piston 221 is connected to the air spraying piston 512. The liquid spraying pump cylinder 222 is respectively communicated to the liquid storage cavity 21 and the liquid spraying position 11 through the liquid guide pipe group 23. The air spraying pump cylinder 511 is communicated to the air spraying position 13 through the air guide pipe group 52.

As shown in FIG. 12, the transmission rack 64 is arranged on the liquid spraying piston 221 and/or the air spraying piston 512. The elastic member 65 is in driving connection to the liquid spraying piston 221 and/or the air spraying piston 512.

It can be understood that the liquid spraying pump cylinder 222 is fixed inside or to a side wall of the shell 1, and the liquid spraying piston 221 is slidably arranged inside the liquid spraying pump cylinder 222. The liquid spraying pump cylinder 222 is respectively communicated to the liquid storage cavity 21 and the liquid spraying position 11 through the liquid guide pipe group 23, thus pumping liquid. The air spraying pump cylinder 511 is fixed to a side wall of or inside the shell 1, and the air spraying piston 512 is slidably arranged inside the air spraying pump cylinder 511. The air spraying pump cylinder 511 is communicated to the air spraying position 13 through the air guide pipe group 52, thus pumping air.

The liquid spraying pump cylinder 222 and the air spraying pump cylinder 511 can be configured to be fixed as a whole through a connecting piece, or can be configured to be connected by bonding. Or, the liquid spraying pump cylinder 222 and the air spraying pump cylinder 511 can be configured to be integrally formed and manufactured together.

The liquid spraying piston 221 and the air spraying piston 512 can be configured to be connected by a connecting rod, to move synchronously. The liquid spraying piston 221 and the air spraying piston 512 can also be configured to be in fused connection, bonded connection, threaded connection, or plugged connection. Certainly, the liquid spraying piston 221 and the air spraying piston 512 can also be configured to be integrally formed and manufactured together.

It should be noted that the power motor 61 drives the liquid spraying piston 221 and the air spraying piston 512 to move synchronously through the transmission rack 64, thus achieving synchronous pumping of liquid and air. The elastic member 65 provides power when the liquid spraying piston 221 and the air spraying piston 512 are reset, to ensure the pumping efficiency. The linkage between the liquid spraying pump and the air spraying pump can reduce a quantity of independent components and lower the assembling complexity. Simultaneous spraying of liquid and air can improve synchronization between water mist flowing and liquid spraying, which further enhances the simulation on gun flame and increases the simulation degree of the product.

As shown in FIG. 4, FIG. 5, and FIG. 10, in some implementations of the water gun 10, one end of the liquid spraying pump cylinder 222 is communicated to the liquid spraying position 11 through the liquid guide pipe group 23. A side wall of the liquid spraying pump 22 is communicated to the liquid storage cavity 21 through the liquid guide pipe group 23, and the other end of the liquid spraying pump cylinder 222 is aligned and communicated to an end portion of the air spraying pump cylinder 511. A side wall of the air spraying pump cylinder 511 is communicated to the air spraying position 13 through the air guide pipe group 52.

It can be understood that a front end of the liquid spraying pump cylinder 222 is directly connected to the liquid spraying position 11 through the liquid guide pipe group 23, to output pressurized liquid. The side wall of the liquid spraying pump cylinder 222 is communicated to the liquid storage cavity 21 through the liquid guide pipe group 23, to form a liquid suction channel.

The side wall of the air spraying pump cylinder 511 is communicated to the air spraying position 13 through the air guide pipe group 52, to release compressed air. A front end of the air spraying pump cylinder 511 is aligned with a tail end of the air spraying pump cylinder 222 to form a coaxial cavity structure, thus achieving physical linkage between the liquid spraying pump and the air spraying pump.

The liquid spraying piston 221 inside the liquid spraying pump cylinder 222 and the air spraying piston 512 inside the air spraying pump cylinder 511 are fixed by a rigid connecting rod or an integrally formed structure, to ensure synchronous reciprocating motion. When the pistons move, a negative pressure is generated inside the liquid spraying pump cylinder 222, and liquid is sucked from the liquid storage cavity 21. The air spraying pump cylinder 511 sucks air from the outside and compresses the air.

It should be noted that in an actual operating process, the pressurized liquid in the liquid spraying pump cylinder 222 is sprayed through the liquid guide pipe group 23 at the front end. The compressed air in the air spraying pump cylinder 511 is sprayed out through the air guide pipe group 52 on the side wall, and the spraying direction is designed to be coaxial with or staggered from the water mist spraying direction, which enhances the water mist diffusion effect.

It should also be noted that in this embodiment, the two pump cylinders are aligned axially to reduce spaces occupied by independent pump bodies, so that the internal layout of the water gun is more compact, and the weight distribution is more ergonomic.

Further, an air flow check valve can be arranged on the side wall of the air spraying pump cylinder 511, or the side wall of the air spraying pump cylinder 511 can be communicated to the outside of the shell 1 through an air pipe, and an air flow check valve can be arranged at an inlet end of the air pipe. In this way, in the process of pumping an air flow, the air flow can flow into the air spraying pump cylinder 511 through the air flow check valve. During pumping of the air flow, the air flow can be prevented from flowing out via the air flow check valve, thus ensuring that the air flow is fully supplied to the air spraying position for spraying, then ensuring a disturbance effect of the air flow on the water mist, and enhancing the simulation effect of the product on gun flame.

Further, the air spraying pump cylinder 511 can be configured to spray air through the air spraying position and suck air through the air spraying position. In this way, in actual operating process, pumping out and pumping in of the air flow do not affect the diffusion of the water mist. In fact, the reciprocating air flow can quickly disturb the water mist and enhance the gun flame effect. Meanwhile, since an air inlet channel and/or an air inlet check valve is eliminated, the difficulty of production and assembling of the product is lowered, the manufacturing costs of the product re reduced, and the overall compactness is improved.

Further, in order to solve the problem that the air and the liquid are easily mixed if the liquid spraying pump cylinder 222 and the air spraying pump cylinder 511 communicated to each other, the present disclosure can use at least the following implementations:

In the first implementation, a separation structure (such as a partition plate or a check valve) is arranged at a joint between the air spraying pump cylinder and the liquid spraying pump cylinder, thus forming an independent air chamber and an independent liquid chamber. In this way, the air chamber is only used for air circulation, and the liquid chamber is only used for liquid circulation, which can avoid air-liquid mixing.

In the second implementation, sealing rings (such as rubber rings or silicone pads) are respectively arranged on both the air spraying piston and the liquid spraying piston, to prevent the air from seeping into the liquid chamber or prevent the liquid from seeping into the air chamber.

As shown in FIG. 2, in some implementations of the water gun 10, the water gun 10 further includes a support mechanism 7. The support mechanism 7 is arranged inside the shell 1, and the to-be-atomized liquid tank 31 and the atomizing element 32 are respectively connected to the support mechanism 7. As shown in FIG. 8, a liquid passing hole 711, an air passing hole 712, and an atomizing hole 713 are provided in the support mechanism 7. The liquid guide pipe group 23 passes through the liquid passing hole 711 and is communicated to the liquid spraying position 11. The air guide pipe group 52 is communicated to the air spraying position 13 through the air passing hole 712. The to-be-atomized liquid tank 31 is communicated to the atomizing element 32 through the atomizing hole 713.

It can be understood that the support mechanism 7 plays a role in fixing a relative position between the to-be-atomized liquid tank 31 and the atomizing element 32, thus ensuring the continuity of liquid atomization, namely, ensuring the continuity of the water mist. The support mechanism 7 is further configured to provide a passing channel (the liquid passing hole 711 and the air passing hole 712) for the liquid guide pipe group 23 and the air guide pipe group 52, to avoid cross interference of pipelines. The provision of the atomizing hole 713 allows the liquid in the to-be-atomized liquid tank 31 to flow to atomizing element 32 for atomization.

As shown in FIG. 8. in some implementations of the water gun 10, the support mechanism 7 includes a support plate 71 and a mounting plate 72. The support plate 71 is arranged inside the shell 1. The liquid passing hole 711, the air passing hole 712, and the atomizing hole 713 are all located on the support plate 71. The mounting plate 72 and the to-be-atomized liquid tank 31 are respectively pressed against two opposite side surfaces of the support plate 71. The mounting plate 72 is connected to the to-be-atomized liquid tank 31. The atomizing element 32 is located between the support plate 71 and the mounting plate 72. The to-be-atomized liquid tank 31 and the support plate 71 jointly define a to-be-atomized liquid cavity 313. The to-be-atomized liquid cavity 313 is communicated to the atomizing hole 713.

It can be understood that the support plate 71 is configured to fix the to-be-atomized liquid tank, the atomizing element, and the pipelines, to maintain the stability of the positions of the parts. The support plate 71 guides liquid, air, and to-be-atomized liquid to flow respectively through the liquid passing hole, the air passing hole, and the atomizing hole, to achieve functional separation. The mounting plate 72 cooperates with the support plate 71 to form a detachable sandwich structure, which facilitates quick replacement and maintenance of the atomizing element 32.

Specifically, in some implementations of the water gun 10, the atomizing element 32 is an atomizing sheet, and the atomizing sheet is configured to atomize liquid through high-frequency vibration. It can be understood that the atomizing sheet belongs to the prior art. The atomizing sheet can vibrate at a high frequency when powered on for operation, thereby vibrating and dispersing the liquid that is in contact with the atomizing sheet, thus forming water mist.

Specifically, the atomizing sheet can be a piezoelectric ceramic atomizing sheet, a microporous atomizing sheet, an ultrasonic atomizing sheet, or other atomizing sheets capable of atomizing liquid in the prior art. The atomizing sheet is flexibly selected according to an actual usage need, a design requirement, a design specification, and an application scenario. For example, the piezoelectric ceramic sheet can form fine mist, to simulate thin fog of a sniper rifle. The microporous sheet can form thick fog, to simulate diffused thick fog of a shotgun.

As shown in FIG. 4, FIG. 5, and FIG. 10, in some implementations of the water gun 10, the shell 1 includes a gun body 14, a muzzle 15, and a collar 16. The muzzle 15 is connected to the gun body 14. The collar 16 sleeves the muzzle 15, thereby defining an air spraying channel 161 between the collar 16 and the muzzle 15. The air spraying position 13 is located at an end portion of the air spraying channel 161. The air spraying pump 51 is communicated to an air spraying pipeline through the air guide pipe group 52.

It can be understood that the gun body 14 is configured to: mount other components and provide a position for a user to hold or operate. The muzzle 15 is a front-end extension structure of the gun body 14. The collar 16 is nested outside the muzzle 15, forming an annular cavity (the air spraying channel 161) between the collar 16 and an outer wall of the muzzle 15 as an outlet path of the compressed air flow. The air spraying position 13 is arranged at a tail end of the air spraying channel 161, to achieve separation or coordinated outputting of the air flow and the liquid flow.

Figure 3:
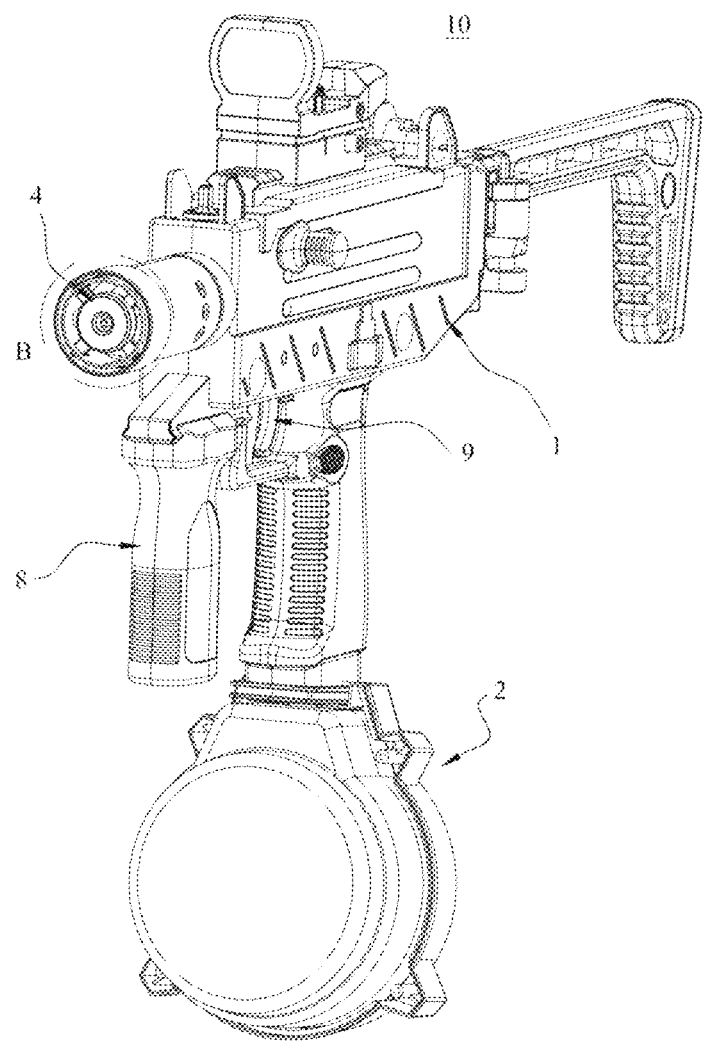
FIG. 3 is a schematic structural diagram of the water gun shown in FIG. 1, viewed in another angle.

As shown in FIG. 1 to FIG. 3, in some implementations of the water gun 10, the water gun 10 further includes a power supply mechanism 8. The power supply mechanism 8 is connected to the shell 1, and the power supply mechanism 8 is electrically connected to the atomizing element 32.

It can be understood that the power supply mechanism 8 is configured to provide stable electrical energy to the atomizing element 32, which ensures that the atomization of the liquid can be continuously performed stably as needed. Certainly, other electrical elements or devices on the water gun 10 can be powered by the power supply mechanism 8.

Further, corresponding circuits can be arranged on the product, so that timing of mist spraying, light effect and an air spraying action can be controlled through circuit linkage, and the multi-module collaborative work can be achieved. Certainly, circuit boards can also be arranged on the product, to control operations of various electrical elements through the circuit boards, so as to satisfy desired working or action timing.

Further, the power supply mechanism 8 can be configured with various components, devices, mechanisms, or the like that can provide power in the prior art. The power supply mechanism 8 can be configured as being detachable or non-detachable. The power supply mechanism 8 can be configured as a rechargeable power source or a non-rechargeable power source.

Figure 6:
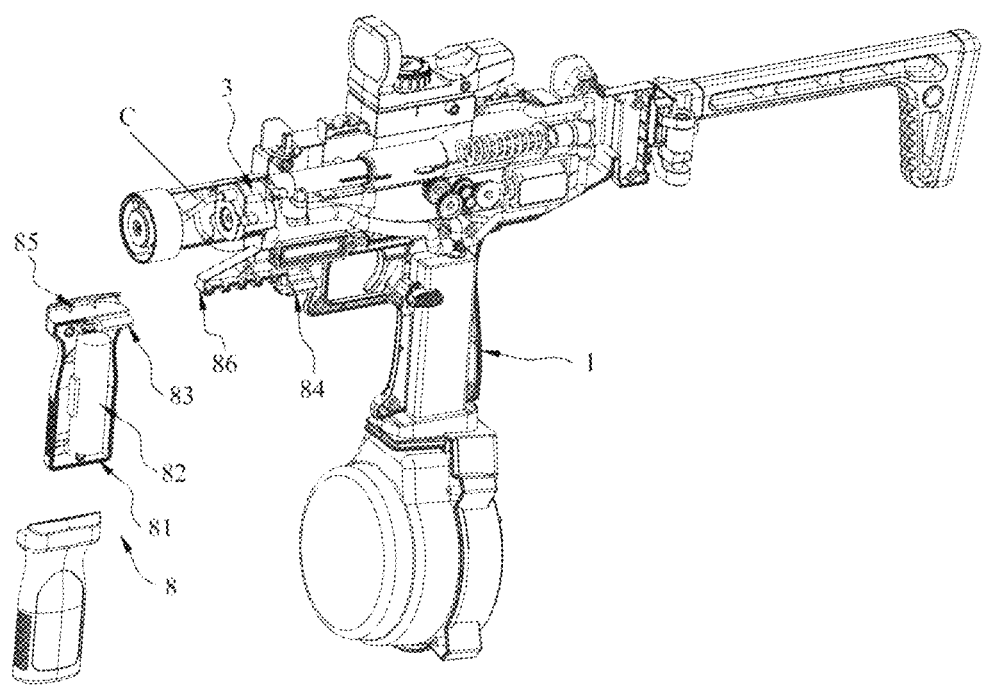
FIG. 6 is a partially structural diagram of a water gun in some embodiments of the present disclosure.
Figure 7:
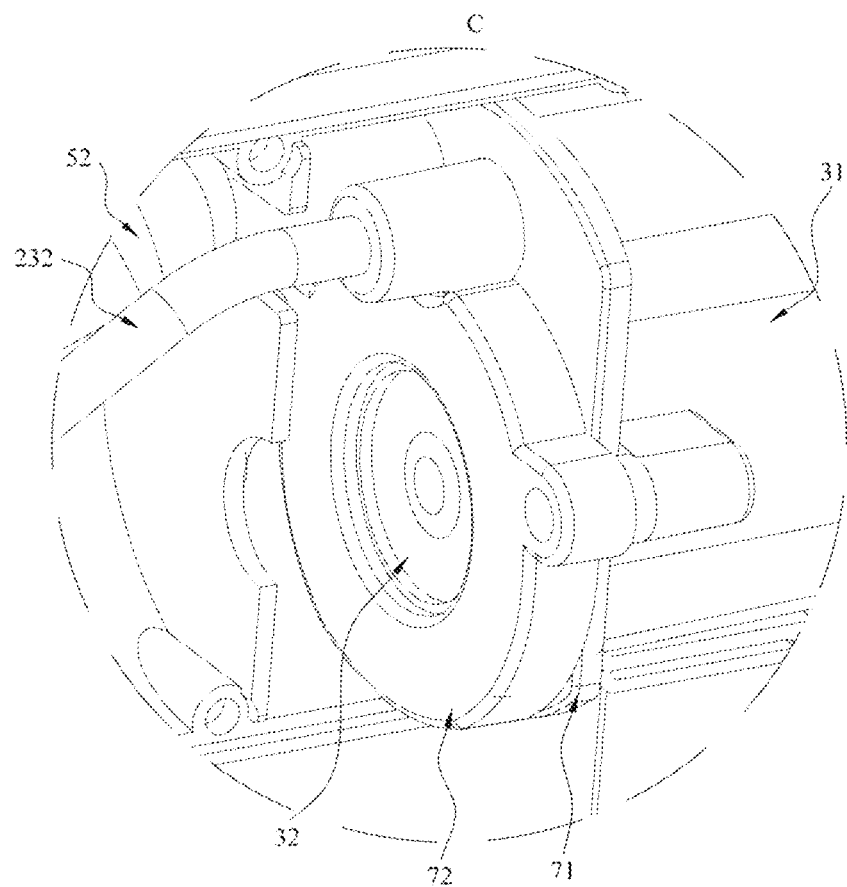
FIG. 7 is an enlarged view of part C in FIG. 6.
Figure 13:
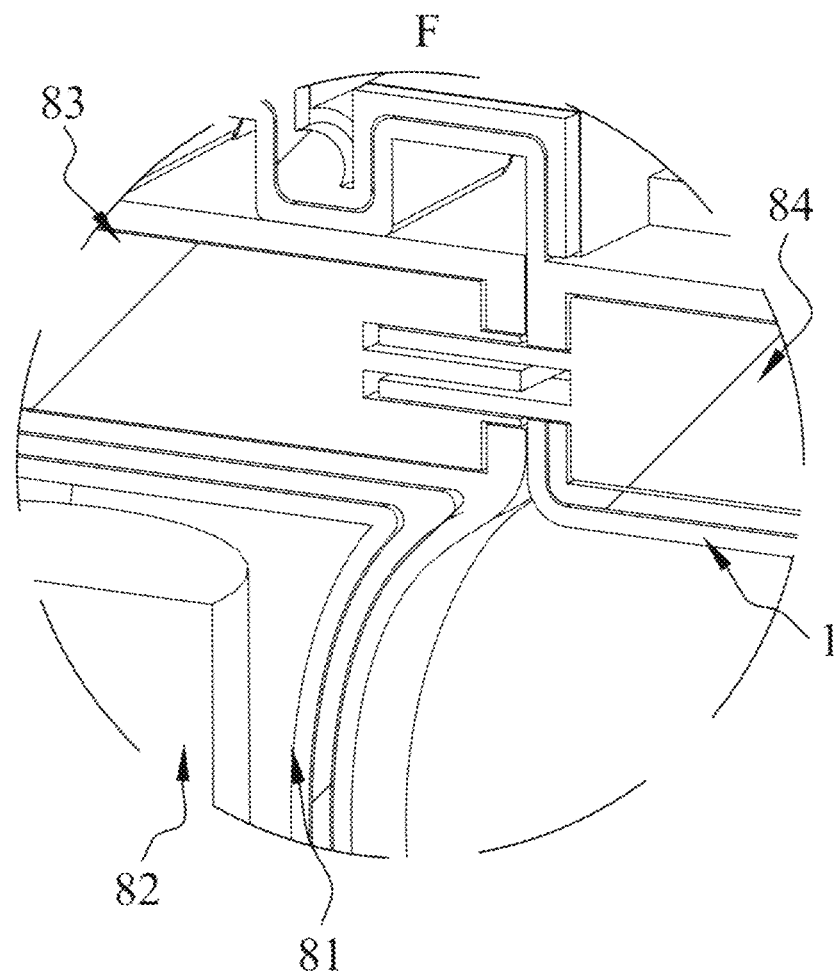
FIG. 13 is an enlarged view of part F of the water gun shown in FIG. 2.

As shown in FIG. 6, FIG. 9, and FIG. 13, in some implementations of the water gun 10, the power supply mechanism 8 includes a slider 81, a battery 82, a first conductive part 83, a second conductive part 84, a sliding chute 85, and a guide rail 86.

One of the sliding chute 85 and the guide rail 86 is arranged on the slider 81, and the other one of the sliding chute 85 and the guide rail 86 is arranged on the shell 1. The battery 82 and the first conductive part 83 are arranged on the slider 81. The second conductive member 84 is arranged on the shell 1. The atomizing element 32 is electrically connected to the atomizing element 32.

The slider 81 is slidably connected to the shell 1 through the sliding chute 85 and the guide rail 86, so that the first conductive part 83 is detachably connected to the second conductive part 84. The battery 82 is electrically connected to the atomizing element 32 through the first conductive part 83 and the second conductive part 84.

It can be understood that the slider 81 is configured to integrate the battery 82 with the first conductive part 83, thereby forming a movable power supply module. By cooperation between the sliding chute 85 and the guide rail 86, the slider slides in a preset direction of the shell 1 (the sliding is usually horizontal sliding, vertical sliding, or inclined sliding).

The battery 82 can be configured as a dry battery or a lithium battery. A quantity of the battery, a voltage, and the like are specifically selected according to a requirement of an electrical component.

The first conductive part 83 and the second conductive part 84 can be configured as conductive elastic sheets in the prior art, or as conductive plugging structures in the prior art, to ensure that a circuit is turned on after the slider 81 slides in place. When the slider 81 is separated, the first conductive part 83 is separated from the second conductive part 84, to cut off the power source.

It should be noted that by using the technical solution of this embodiment, a user can quickly mount and remove the power supply mechanism 8, thus improving the convenience of use of the product.

Further, a limiting boss or a magnetic latch can be arranged at a tail end of the sliding chute 85 or the guide rail 86, to prevent the slider from being accidentally separated.

As shown in FIG. 2, in some embodiments of the water gun 10, the liquid spraying mechanism 2 can be configured to include a liquid storage shell 24. The liquid storage cavity 21 is located inside the liquid storage shell 24. The liquid storage shell 24 is provided with an injection hole 241 and a discharge hole 242, and the liquid storage shell 24 is connected to the shell 1.

It can be understood that the injection hole 241 is used to inject liquid into the liquid storage cavity 21. The discharge hole 242 is used to discharge the liquid inside the liquid storage cavity 21 to the corresponding pump. The liquid storage shell 24 can be configured to be fixedly connected to the shell 1, and the liquid storage shell 24 can also be configured to be detachably connected to the shell 1.

Figure 14:
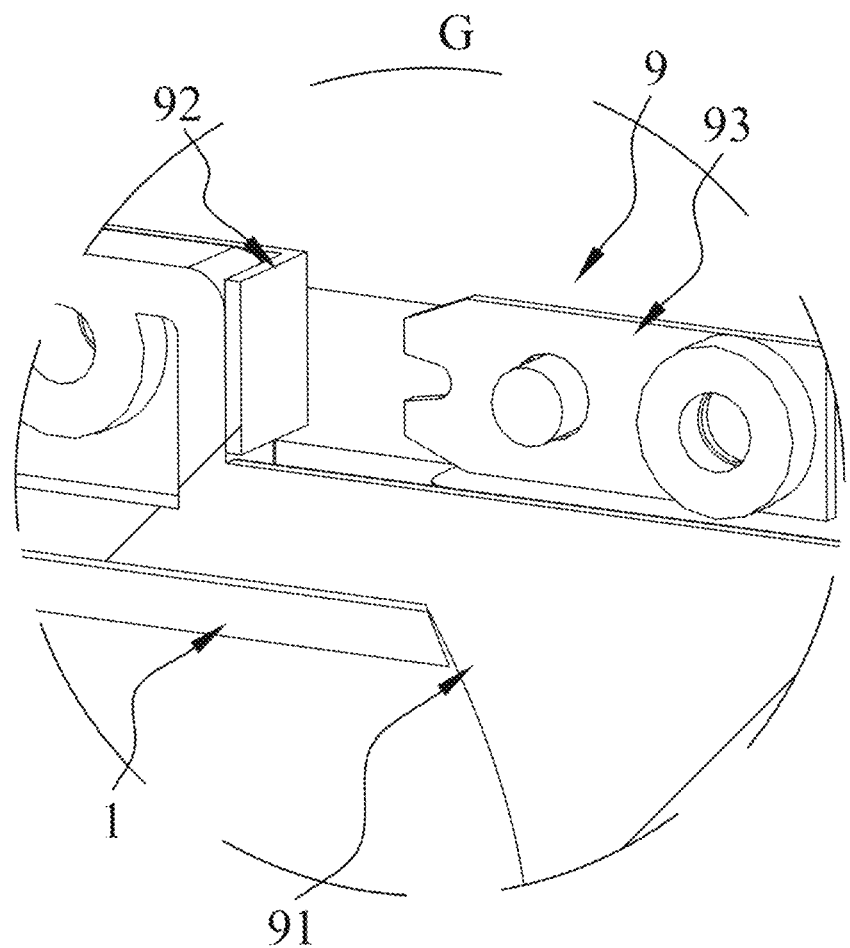
FIG. 14 is an enlarged view of part G of the water gun shown in FIG. 2.

As shown in FIG. 1 to FIG. 3, in some implementations of the water gun 10, the water gun 10 further includes an excitation mechanism. As shown in FIG. 14, the excitation mechanism 9 includes a trigger 91, a first contact 92, and a second contact 93. The trigger is movably arranged on the shell. The first contact is arranged on the trigger, and the second contact is arranged on the shell. The first contact can be pressed against the second contact under the driving of the trigger, so that the first contact and the second contact are connected.

It can be understood that after the first contact and the second contact are connected, the liquid spraying mechanism 2 is triggered to operate to spray liquid, and the mist spraying mechanism 3 is controlled to operate to spray water mist. If an air spraying mechanism is provided, the air spraying mechanism 5 will be triggered to operate to spray air.

The present disclosure has the following beneficial effects:

The present disclosure relates to a water gun. By the arrangement of the liquid spraying mechanism and the mist spraying mechanism, liquid can be sprayed from the liquid spraying position, and mist can be sprayed from the mist spraying position, which greatly enriches functionality of the product. Furthermore, liquid and mist can be sprayed simultaneously, so that an effect of gun flame of a firearm can be simulated through water mist, which greatly increases a simulation degree of the product.

The schemes of the present disclosure have been described in more details above with reference to the accompanying drawings. In the foregoing embodiments, the description of each embodiment has respective focuses. For a part that is not described in detail in an embodiment, reference may be made to related descriptions in other embodiments. Those skilled in the art should also be aware that the actions and modules involved in this specification may not be necessary for the present disclosure. Furthermore, it can be understood that the steps in the method of the embodiments of the present disclosure can be sequentially adjusted, merged, and deleted according to actual needs. The modules in the device of the embodiments of the present disclosure can be merged, partitioned, and deleted according to actual needs.

The above has described the various embodiments of the present disclosure. The above explanation is exemplary, not exhaustive, and is not limited to the various embodiments disclosed herein. Many modifications and changes are obvious to those of ordinary skill in the art without deviating from the scope and spirit of the various embodiments described herein. The selection of the terms used herein aims to best explain the principles and practical applications of the various embodiments or improvements to technologies in the market, or to enable other persons of ordinary skill in the art to understand the various embodiments disclosed herein.

What is claimed is:

1. A water gun, comprising:
a shell, provided with a liquid spraying position and mist spraying position;
a liquid spraying mechanism, comprising a liquid storage cavity, a liquid spraying pump, and a liquid guide pipe group, wherein the liquid storage cavity and the liquid spraying pump are arranged on the shell; the liquid spraying pump is respectively communicated to liquid storage cavity and the liquid spraying position through the liquid guide pipe group; the liquid spraying pump is configured to pump liquid inside the liquid storage cavity to the liquid spraying position for spraying; and
a mist spraying mechanism, comprising a to-be-atomized liquid tank and an atomizing element, wherein the to-be-atomized liquid tank is connected to the shell; the atomizing element is configured to: receive liquid inside the to-be-atomized liquid tank and atomize the liquid; and a water mist output end of the atomizing element is communicated to the mist spraying position;
wherein the mist spraying mechanism further comprises an atomization supply pump; a pump-in end of the atomization supply pump is communicated with the liquid storage cavity; and a pump-out end of the atomization supply pump is communicated with the to-be-atomized liquid tank;
wherein the mist spraying mechanism further comprises a four-way joint; the four-way joint is communicated with the liquid storage cavity;
the liquid spraying pump is communicated to the four-way joint through the liquid guide pipe group;
the to-be-atomized liquid tank is provided with a reflux inlet; the reflux inlet is communicated to the four-way joint; and
the pump-in end of the atomization supply pump is communicated to the four-way joint.

2. The water gun according to claim 1, wherein the to-be-atomized liquid tank is provided with a to-be-atomized liquid filling port.

3. The water gun according to claim 1, wherein the liquid guide pipe group comprises a liquid spraying pump input pipe, a liquid spraying pump output pipe, a to-be-atomized liquid input pipe, a to-be-atomized liquid output pipe, and a to-be-atomized liquid reflux pipe;
one end of the liquid spraying pump input pipe is communicated to the four-way joint, and the other end of the liquid spraying pump input pipe is communicated to an input end of the liquid spraying pump; one end of the liquid spraying pump output pipe is communicated to an output end of the liquid spraying pump; the other end of the liquid spraying pump output pipe is communicated to the liquid spraying position;
one end of the to-be-atomized liquid input pipe is communicated to the four-way joint; the other end of the to-be-atomized liquid input pipe is communicated to the pump-in end of the atomization supply pump; one end of the to-be-atomized liquid output pipe is communicated to the pump-out end of the atomization supply pump; one end of the to-be-atomized liquid reflux pipe is communicated to the reflux inlet; and the other end of the to-be-atomized liquid reflux pipe is communicated to the four-way joint.

4. The water gun according to claim 1, wherein the shell is provided with a muzzle; the liquid spraying position and the mist spraying position are both located on the muzzle;
the water gun further comprises a light-emitting mechanism; the light-emitting mechanism comprises a mounting base and at least one light-emitting element; the mounting base is arranged on the muzzle; and the light-emitting element is arranged on the mounting base.

5. The water gun according to claim 4, wherein the mounting base comprises a mounting ring and at least one connecting arm; the liquid spraying position is arranged on the mounting ring; a through hole is provided in the liquid spraying position for liquid spraying; each connecting arm is arranged on the mounting ring; the connecting arm is connected to the muzzle; a peripheral outer side wall of the mounting ring and an inner wall surface of the muzzle jointly define the mist spraying position; and
the connecting arm and/or the mounting ring is provided with the light-emitting element.

6. The water gun according to claim 1, wherein the shell is further provided with an air spraying position;
the water gun further comprises an air spraying mechanism; the air spraying mechanism comprises an air spraying pump and an air guide pipe group; the air spraying pump is mounted on the shell; the air spraying pump is communicated to the air spraying position through the air guide pipe group; and the air spraying pump is configured to pump air to the air spraying position, so that the air is sprayed out through the air spraying position.

7. The water gun according to claim 6, further comprising a power mechanism, wherein the power mechanism comprises a first motor and a second motor; the first motor is in driving connection to the liquid spraying pump; and the second motor is in driving connection to the air spraying pump.

8. The water gun according to claim 6, further comprising a power mechanism, wherein the power mechanism comprises a power motor, an output gear, an intermittent transmission gear, a transmission rack, an elastic member, and several transmission gears;
the power motor is connected to the shell; the power motor is in driving connection to the output gear; the output gear is meshed with one of the transmission gears; the transmission gears are meshed in sequence; the intermittent transmission gear is coaxially connected to another transmission gear, and is meshed with the transmission rack; the transmission rack is arranged on the liquid spraying pump and/or the air spraying pump; the elastic member is in driving connection to the liquid spraying pump and/or the air spraying pump;
when the power motor outputs a torque, the liquid spraying pump and the air spraying pump are driven to move, thereby increasing elastic potential energy of the elastic member; and the elastic member is configured to drive the liquid spraying pump and the air spraying pump to move when released, so that the liquid spraying pump pumps liquid, and the air spraying pump pumps air.

9. The water gun according to claim 8, wherein the liquid spraying pump comprises a liquid spraying pump cylinder and a liquid spraying piston; the liquid spraying pump cylinder is connected to the shell; the liquid spraying piston is slidably arranged inside the liquid spraying pump cylinder;

the air spraying pump comprises an air spraying pump cylinder and an air spraying piston; the air spraying pump cylinder is connected to the shell; the air spraying piston is slidably arranged inside the air spraying pump cylinder;

the liquid spraying pump cylinder is connected to the air spraying pump cylinder; the liquid spraying piston is connected to the air spraying piston; the liquid spraying pump cylinder is respectively communicated to the liquid storage cavity and the liquid spraying position through the liquid guide pipe group; the air spraying pump cylinder is communicated to the air spraying position through the air guide pipe group;

the transmission rack is arranged on the liquid spraying piston and/or the air spraying piston; and the elastic member is in driving connection to the liquid spraying piston and/or the air spraying piston.

10. The water gun according to claim 9, wherein one end of the liquid spraying pump cylinder is communicated to the liquid spraying position through the liquid guide pipe group; a side wall of the liquid spraying pump is communicated to the liquid storage cavity through the liquid guide pipe group, and the other end of the liquid spraying pump cylinder is aligned and communicated to an end portion of the air spraying pump cylinder; and a side wall of the air spraying pump cylinder is communicated to the air spraying position through the air guide pipe group.

11. The water gun according to claim 9, further comprising a support mechanism, wherein the support mechanism is arranged inside the shell, and the to-be-atomized liquid tank and the atomizing element are respectively connected to the support mechanism;

a liquid passing hole, an air passing hole, and an atomizing hole are provided in the support mechanism; the liquid guide pipe group passes through the liquid passing hole and is communicated to the liquid spraying position; the air guide pipe group is communicated to the air spraying position through the air passing hole; and the to-be-atomized liquid tank is communicated to the atomizing element through the atomizing hole.

12. The water gun according to claim 11, wherein the support mechanism comprises a support plate and a mounting plate; the support plate is arranged inside the shell; the liquid passing hole, the air passing hole, and the atomizing hole are all located on the support plate; the mounting plate and the to-be-atomized liquid tank are respectively pressed against two opposite side surfaces of the support plate; the mounting plate is connected to the to-be-atomized liquid tank; the atomizing element is located between the support plate and the mounting plate; the to-be-atomized liquid tank and the support plate jointly define a to-be-atomized liquid cavity; and the to-be-atomized liquid cavity is communicated to the atomizing hole.

13. The water gun according to claim 1, wherein the atomizing element is an atomizing sheet, and the atomizing sheet is configured to atomize liquid through high-frequency vibration.

14. The water gun according to claim 6, wherein the shell comprises a gun body, a muzzle, and a collar; the muzzle is connected to the gun body; the collar sleeves the muzzle, thereby defining an air spraying channel between the collar and the muzzle; the air spraying position is located at an end portion of the air spraying channel; and the air spraying pump is communicated to an air spraying pipeline through the air guide pipe group.

15. The water gun according to claim 1, further comprising a power supply mechanism, wherein the power supply mechanism is connected to the shell, and the power supply mechanism is electrically connected to the atomizing element.

16. The water gun according to claim 15, wherein the power supply mechanism comprises a slider, a battery, a first conductive part, a second conductive part, a sliding chute, and a guide rail;

one of the sliding chute and the guide rail is arranged on the slider, and the other one of the sliding chute and the guide rail is arranged on the shell; the battery and the first conductive part are arranged on the slider; the second conductive part is arranged on the shell; the atomizing element is electrically connected to the atomizing element;

the slider is slidably connected to the shell through the sliding chute and the guide rail, so that the first conductive part is detachably connected to the second conductive part; and the battery is electrically connected to the atomizing element through the first conductive part and the second conductive part.

* * * * *